United States Patent [19]
Sutherland

[11] Patent Number: 6,041,657
[45] Date of Patent: Mar. 28, 2000

[54] OUTDOOR NOISE TESTING SYSTEM

[75] Inventor: Mark B. Sutherland, Peoria, Ill.

[73] Assignee: Caterpillar, Inc., Peoria, Ill.

[21] Appl. No.: 08/997,437

[22] Filed: Dec. 23, 1997

[51] Int. Cl.[7] .................................................. G01H 11/06
[52] U.S. Cl. ............................................... 73/646; 381/56
[58] Field of Search ........................... 73/646, 647, 648; 381/56; 701/29; 340/943

[56] References Cited

U.S. PATENT DOCUMENTS

| | | | |
|---|---|---|---|
| 3,661,224 | 5/1972 | Allen et al. ................................ | 73/647 |
| 4,307,385 | 12/1981 | Evans et al. ............................... | 73/647 |
| 5,172,597 | 12/1992 | Hedeen ...................................... | 73/646 |

*Primary Examiner*—John E. Chapman
*Attorney, Agent, or Firm*—Steven G. Kibby; Marla L. Hudson; Jeffery L. Myers

[57] ABSTRACT

Apparatus for automatically determining the total sound power emitted by a work machine. The noise testing system employs a processor and remote control to control the measurement of both exterior and interior sound generated by a work machine in either a dynamic or static operating mode.

20 Claims, 3 Drawing Sheets

6,041,657

OUTDOOR NOISE TESTING SYSTEM

TECHNICAL FIELD

This invention relates to the area of sound measurements, and more particularly to automatically determining the total sound power emitted from a work machine.

BACKGROUND ART

Sound emitted by noise sources, such as construction equipment, is an important design and manufacture consideration. Sound emission testing of such products is often necessary to verify noise specification standards. For example, the International Organization for Standardization ("ISO") has developed test code standards for exterior and operator noise levels for such work machines in stationary and dynamic conditions designated ISO 6393-6396. It is essential for manufacturers to test work machines to determine whether they meet such test code standards.

In particular, construction equipment manufacturers have a heightened awareness of noise emission requirements because of particular European Economic Council directives, such as 86/662/EEC, which require earthmoving equipment manufacturers to place a label on their equipment specifying the noise the machine emits. The manufacturer must provide a "Certificate of Conformity" which guarantees that the machine emits noise levels less than or equal to that shown on the label. The impact upon manufacturers is significant because the directive requires accurate documentation of noise emissions from machines leaving the assembly lines.

To simplify measurement procedures, it would be desirable to utilize a noise testing system that the manufacturer can use to conduct measurements at or near the assembly site. Conventional systems are costly and constrained because they are located indoors. The indoor location may raise concerns regarding both safety and set-up time issues, and may not meet many test-code standards. Likewise, outdoor noise testing according to the standards often require more than one skilled worker to simultaneously operate the work implement and the testing equipment, and long setup and testing times. It would be desirable to have a user-friendly system in which one worker can perform all of the required testing in a short period of time.

The present invention is directed to overcoming one or more of the problems as set forth above.

DISCLOSURE OF THE INVENTION

In one aspect of the invention, an apparatus for measuring work machine sound power is provided, including exterior sound measurement sensors for sensing exterior sound of a work machine and delivering exterior sound signals, an interior sound measurement sensor for sensing interior sound of a work machine and delivering an interior sound signal, a processor for processing the exterior and interior sound signals and calculating sound power, and a remote control for remotely controlling the operation of the sound measurement system from the operator cab of a work machine.

In a second aspect of the invention, an apparatus for measuring dynamic sound power is provided, including elements for sensing movement of a work machine relative to an arrangement of exterior sound measurement sensors and responsively initiating and terminating delivery of exterior sound signals to a central processor, an interior sound measurement sensor for sensing interior sound of a work machine and delivering an interior sound signal, a processor for processing the interior and exterior sound signals and calculating sound power, and a remote control for controlling the operation of the sound measurement system from the work machine operator cab.

DETAILED DESCRIPTION OF THE INVENTION

Figure 1:
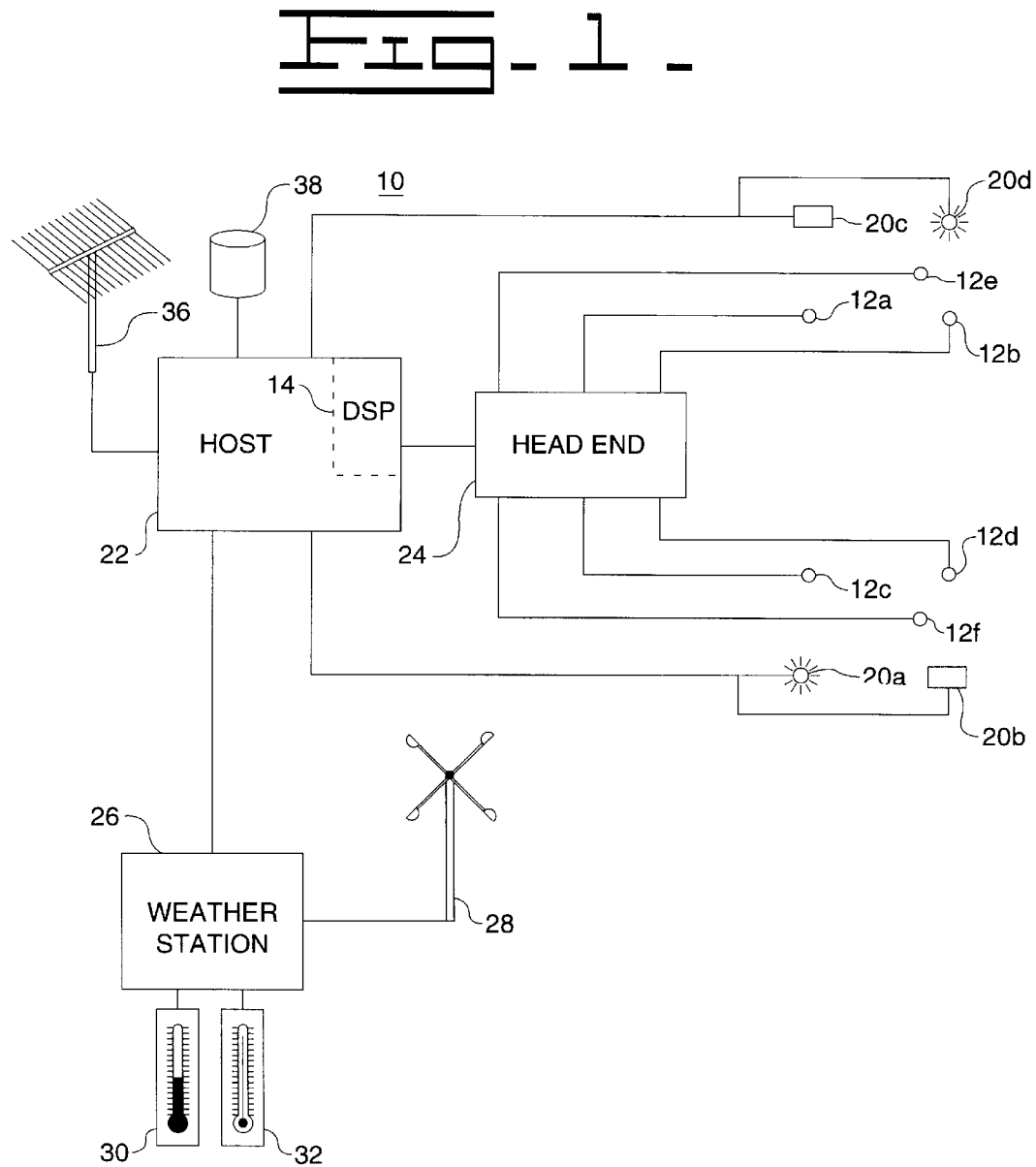
FIG. 1 is a block diagram illustrating an arrangement of elements of the noise testing system.

With reference to the drawings, FIG. 1 is a block diagram of an outdoor noise testing system 10 for determining the level equivalent average noise generated by a work implement under specified conditions. The noise testing system 10 is utilized to conduct both dynamic and static sound measurements of a work machine according to ISO standards. The work machine may be a piece of construction equipment such as a bulldozer, wheel loader, back-hoe, or an off-highway truck, although the invention is not limited to a specific type of work machine under test.

The noise testing system 10 includes a plurality of exterior sound measurement assemblies 12a–12f, for generating signals representative of the sound produced by a work machine at various specified surrounding points. The ISO requires six measurement positions on a hemispheric surface having a radius dependent upon length for earthmoving machinery, which corresponds to a radius of sixteen meters for machines over four meters long.

Figure 2:
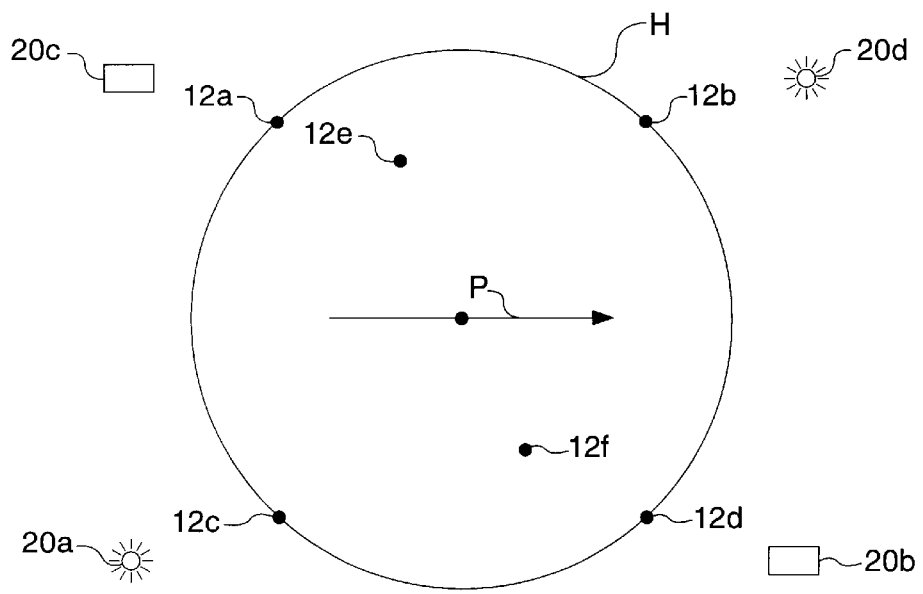
FIG. 2 is an overhead view of a test site layout for the noise testing system.

Sound measurement assemblies 12a–f are positioned in an exemplary embodiment at various locations and elevations dictated by ISO test procedures as illustrated in FIG. 2, but the number and position of the microphone assemblies can be manually or automatically altered for particular test procedures to be performed or local regulations. The ISO test hemisphere H is defined by four of the assemblies 12a–12d spaced along equidistant arcs surrounding the machine at a height of one and a half meters above the ground, with the remaining two assemblies 12e,12f mounted on masts (not shown) at a height equal to seventy-one percent of the radius, along a chord offset from the centerline of a path P of machine travel across the test hemisphere H.

Assemblies 12a–12f preferably include a microphone and preamplifier, along with a dehumidifier, rain cover, windscreen, and bird spikes to protect the mechanisms from the elements. Each assembly delivers exterior sound signals to a head end 24, which provides various calibration and line currents required for operation. The head end 24 delivers the exterior sound signals to a digital signal processor 14, which preferably is embodied in a DSP adapted for installation on a peripheral device bus of a personal computer. The PULSE multi-analyzer system manufactured by Bruel and Kjaer Instruments, Inc. provides a modularized front end and PC-based interface and DSP boards suitable for this application. Semi-automated acoustical calibration of the sound measurement instrumentation is readily performed using the PULSE system's integral Charge Injection techniques.

Figure 3:
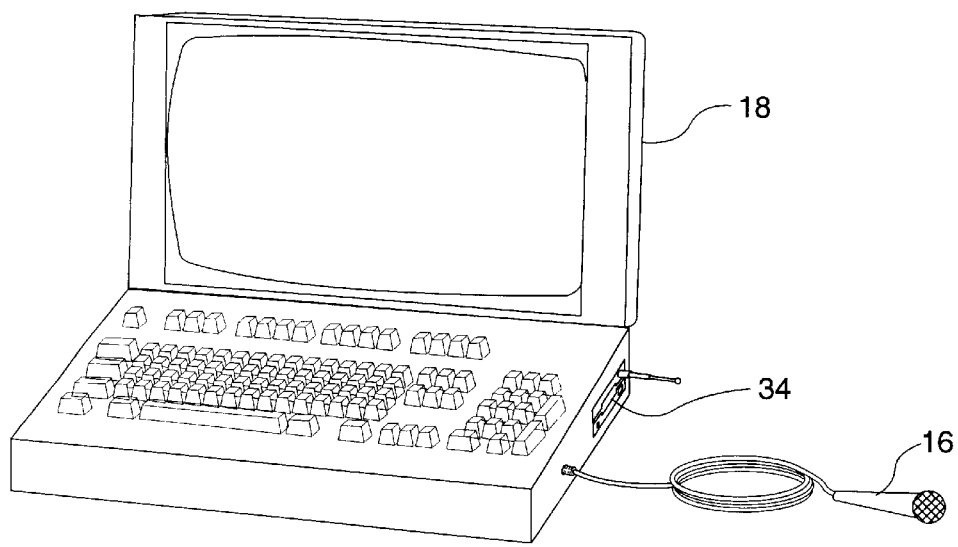
FIG. 3 is a block diagram of the portable remote components of the noise testing system.

The noise testing system 10 further includes a portable component, illustrated in FIG. 3, for remote data acquisition and control of processor 14 by the operator from within the work machine. In a preferred embodiment, a remote control 18 provides the necessary operator interface with the system via a hand held wireless computer terminal, having a pen-based or alphanumeric keypad input capability and an LCD display. The remote control 18 is in wireless communication with the processor 14, for example via a radio frequency PC Type II card 34 adapted for local area network (LAN) connectivity. Remote control 18 also should be capable of two-way communication with an interior sound measurement sensor 16.

Interior sound measurement sensor 16 measures the interior (operator) noise produced by a work machine and delivers an interior sound signal to the processor 14 through remote control 18. A suitable interior sound measurement sensor 16 capable of being worn near the operator's ear is a type one sound level meter (SLM 2236) manufactured by Bruel & Kjaer, which provides measurements over a serial (RS232) port to the remote control 18.

The noise testing system 10 simultaneously tests both the exterior and the interior noise levels, and is primarily intended to be controlled by remote control 18. The remote control 18 advantageously allows a single person to control the noise testing system 10 from any location, particularly while operating the work machine to perform dynamic testing. Dynamic test protocols require the machine to be driven through the test hemisphere in forward and reverse directions, as well as operate specified work implements on the machine.

Location sensing elements 20a–d are employed as a safety and convenience measure for the noise testing system 10, to automatically start and stop sound measurements when the machine travels through the test hemisphere while enabling the operator to concentrate on navigating the work machine. As shown in FIG. 2, the location sensing elements preferably include opposed mode photoelectric sensors 20a through 20d—having both a photo receiver and photo emitter. Respective pairs of sensors are positioned to detect movement of the machine into and out of the test hemisphere, providing additional verification that the sound measurements occurred while the machine is within the exterior sensor arrangement. As defined herein, recognized movement into or out of the test hemisphere is not limited to the precise point where an extreme end of the machine intersects the radius of an imaginary hemisphere, but expressly includes a region generally contemplated by the ISO or a similar body within which the machine should be located for dynamic testing.

The photoelectric sensors are sealed so as not to be adversely affected by the outdoor weather conditions and mounted to rigid structures to maintain alignment. In a preferred embodiment, the mounting includes a ball and socket joint to simplify sensor alignment. Sender/receiver pairs and brackets manufactured by Doig Corporation are suitable for this application.

Returning briefly to FIG. 1, the noise testing system 10 also is provided with a host computer 22, including a data storage device 38 for storing a database, video display, keyboard, printer, and radio frequency LAN card 36 for facilitating communication between the processor 14 and remote control 18. In addition to hosting a PC-card based digital signal processor 14, computer 22 may be used as a backup operator interface to initiate noise testing functions not requiring simultaneous operation of the work machine. All operator functions that are performed by the remote control 18 except interior noise measurement can be initiated using the host computer 22, as well as a number of administrative functions such as maintaining a database of machine test results.

The noise testing system 10 also includes a weather station 26, for generating signals representative of the conditions under which the testing occurs. Background noise, such as that produced by wind and nearby industry and roadways, as well as the rate of propagation of sound through the air in dependence upon the temperature and barometric pressure, have an effect on the accuracy and repeatability of outdoor noise testing. Accordingly, weather station 26 includes an anemometer 28 delivering a signal having a frequency proportional to the rate of rotation, a temperature sensor 30 delivering an ambient temperature signal, and a barometer 32 delivering a barometric pressure signal, to the host computer for recordation of wind speed, temperature and pressure. Although slowly changing conditions such as temperature and pressure may be recorded only once for an identified machine under test, it is deemed desirable to automatically log for each test the average wind speed over the course of that test.

A significant advantage of the present invention is the provision of a database for storing test procedures, as well as significant measured sound parameters and test conditions for each work machine tested, in correspondence with machine identifying information. Machine identifying information may include machine model and serial numbers, engine model and ratings, installed options, or any other indicia useful to distinguish between the various machine types tested. Test procedures may vary depending upon the machine being tested as described hereinafter, and the background noise and other environmental conditions under which a particular machine was tested are relevant to the validity of the results. The ability to retrieve representative samples or detailed test results for machine later found to be out of compliance may assist the manufacturer in resolving regulatory issues.

INDUSTRIAL APPLICABILITY

In order to perform noise testing of a work machine, the operator gains access to the system by logging in with an operator identification, and enters machine identifying information in the remote control 18. Depending upon the machine identified, programmed test cycles corresponding to each test required to be performed may be selected by the operator from among Static, Forward, Reverse, Front Hydraulic, and Rear Hydraulic. Prior to performing a test cycle however, the host computer 22 in conjunction with the processor 14 activates and auto-calibrates the exterior sound measurement sensors 12, then records the test conditions and optionally a background noise level without the machine in operation.

Instructions for required machine operations corresponding to a test cycle are displayed to the operator in accordance with ISO test code standards such as ISO 6393 exterior noise (stationary condition), ISO 6394 operator noise (stationary condition), ISO 6395 exterior noise (dynamic conditions), and ISO 6396 operator noise (dynamic conditions). For example in a static test, remote unit 18 may instruct the operator how to orient the machine within the test hemisphere, to accelerate the engine to rated RPM, and hold that speed for a counted down time period of at least fifteen seconds. In addition, the processor 14 can be programmed by either the remote control 18 or the host computer 22 to conduct other noise measurement procedures or analysis desired by the operator.

As the operator indicates commencement of an operation, either by generating a start trigger manually through remote control 18 or automatically via location sensing elements 20a–d, processor 14 retrieves signals representing sound pressure levels through head end 24 at periodic intervals from each of the sensors 12 and 16. When a stop trigger is generated, equivalent sound pressure levels Leq for the testing period are calculated in accordance with the selected test code standards by digital integration over the measurement time for each sensor, along with a total sound power value across the surface H. The interior sound power measurement is made entirely by sound level meter 16, which connects to the remote control 18 to communicate the interior sound signal to host 22 and processor 14. Overall sound power levels determined for each test are compared to predetermined limits, and a PASS/FAIL indication is displayed to the operator.

For a dynamic test cycle referred to as a drive-by, the operator indicates readiness to begin the test, whereupon remote unit 18 instructs the operator to drive the work machine in forward or reverse through the noise testing area. The location sensing elements 20 sense the work machine as it enters the test hemisphere H and generate a testing cycle start trigger for the processor 14. The location sensing elements 20 also sense when the work machine exits the test hemisphere H and trigger a stop signal to host computer 22 and processor 14 to cease retrieving sensed exterior sound, interior sound, and test condition measurements and begin calculation of equivalent sound pressures/powers. Processor 14 will discard the test cycle data if the stop trigger does not occur within a predetermined maximum time.

In addition to the foregoing programmed ISO test cycles, host computer and remote control are further adapted to allow detailed inspection of test results, in order to diagnose problems with the system or help locate the source of excessive noise being produced by the machine. According to one detail screen, the spatial average is displayed along with the values for each microphone graphically oriented about the machine with its respective ISO position number and background levels listed underneath. A second detail screen plots a ⅓ octave spectrum of the sound pressure level equivalent, showing the corresponding level for each frequency band.

Figure 4:
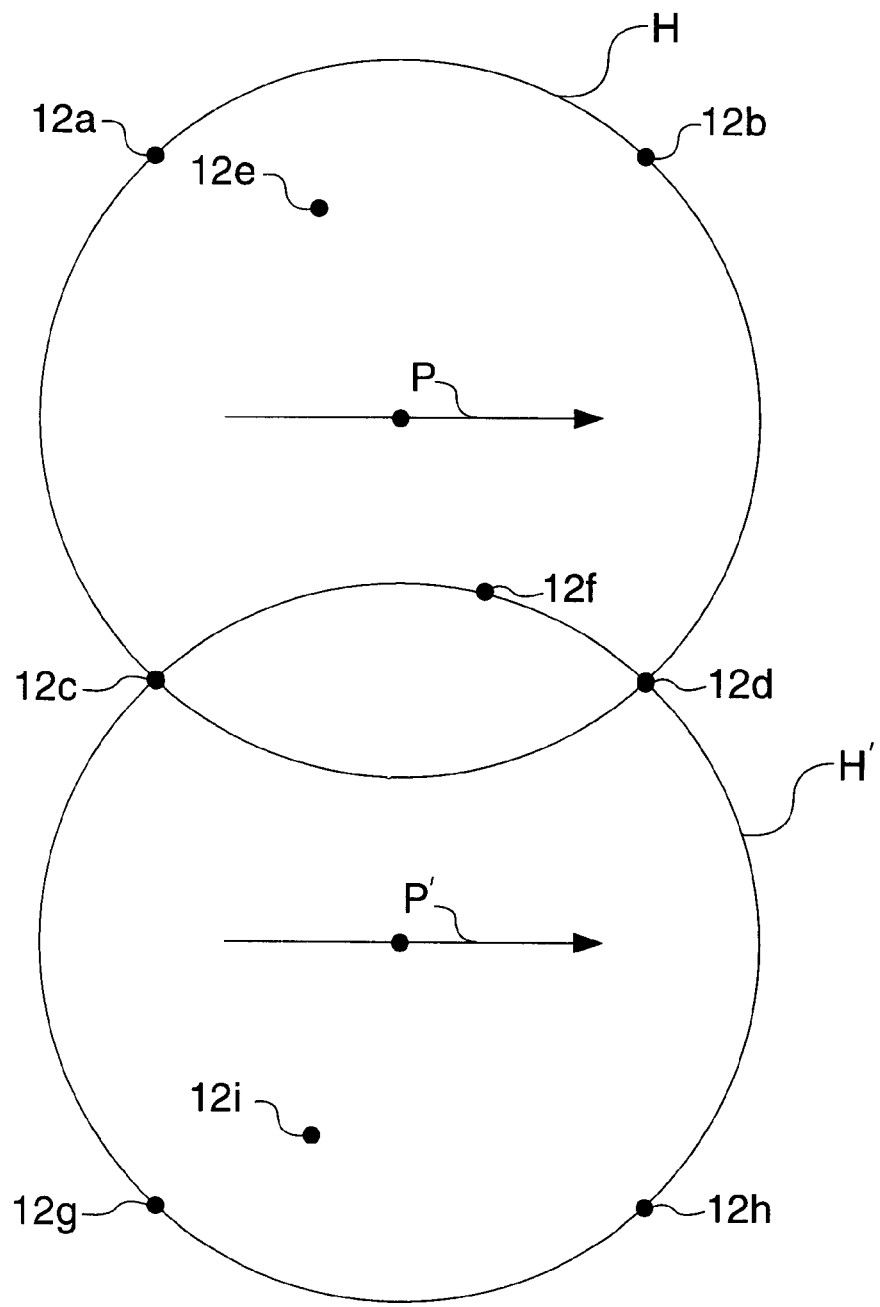
FIG. 4 is an overhead view of the test site layout having two test paths.

Another aspect of the present invention is the provision of multiple testing surfaces. Returning to FIG. 2, providing sensors 12 surrounding the machine along the hemisphere H enables the sound power measurement for each test to be performed in a single operation. ISO requirements also specify however, that a wheeled work machine be tested on a concrete or sealed asphalt surface, while a tracked machine must be tested while traveling along a path P formed of sand. In order to make efficient use of the sensors 12, it may be desirable to provide parallel test paths P of differing surface materials, the two paths having at least one external sensor 12 in common. In a preferred embodiment, as shown in FIG. 4, microphones 12c,12d, and 12f on one side of path P would form an opposite side of a second path P', thereby reducing the number of additional sensors required to three e.g., 12g,12h, and 12i. The higher sensor 12e may be placed on a boom to a corresponding position in a second hemisphere.

Another approach is to utilize only the existing sensors on the nearest side to the second path, i.e., 12c, 12d, and 12f, but take the required six measurements as the machine travels the second path in opposite directions. Remote control 18 provides instructions to the operator to perform the two passes in opposite directions, measuring and combining the two sets of measurements to obtain the total exterior sound power.

What has been described is an outdoor sound testing system permitting a single operator to safely and conveniently control both the testing system and operation of the machine, and generate a database containing a detailed log of the test results. By thereby reducing the cost and complexity of testing for compliance with environmental noise regulations, manufacturers are able to test a much greater percentage of the machines produced and verifiably demonstrate compliance with those regulations.

Other aspects, objects, and advantages of this invention can be obtained from a study of the drawings, the disclosure, and the appended claims.

I/We claim:

1. An apparatus for measuring sound power output by a work machine, comprising:
a plurality of exterior sound measurement sensors surrounding a test path traveled by a work machine for producing sensed exterior sound intensity signals;
processing means for selectively receiving said exterior sound intensity signals and calculating a work machine total sound power level and equivalent sound pressure levels for said plurality of sensors over a selected time period; and
a remote control located on said work machine, the remote control adapted for manually initiating and terminating said selected time period by radio frequency provision of trigger signals to said processing means.

2. An apparatus, as set forth in claim 1, further comprising a host computer having data storage means for storing said sound power and equivalent sound pressure levels in a database in correspondence with machine identifying information uniquely identifying the work machine.

3. An apparatus, as set forth in claim 1, wherein said plurality of exterior sound measurement sensors are arranged along first and second hemispherical surfaces forming parallel test paths, said surfaces having in common at least one exterior sound measurement sensor.

4. An apparatus, as set forth in claim 1, wherein a second path of a differing surface material is formed adjacent said test path, said remote control further comprising means to initiate and terminate first and second said time periods to produce first and second said sensed exterior sound intensity signals as the work machine traverses said second path in opposing orientations, said processing means combining said first and second signals to determine said total sound power.

5. An apparatus as set forth in claim 2, further comprising a weather station for providing values representative of sensed atmospheric conditions to said host computer.

6. An apparatus, as set forth in claim 5, wherein said weather station provides values representing at least one of wind speed, temperature, and barometric pressure to said host computer, and said host computer automatically logs said values in said database in correspondence with said machine identifying information and said sound power and equivalent sound pressure levels.

7. An apparatus, as set forth in claim 1, further comprising an interior sound measurement sensor for sensing sound pressure levels within an operator cab of the work machine and delivering an interior sound signal to said processing means for calculation of operator equivalent sound pressure levels over said selected time period.

8. An apparatus for measuring sound power output by a work machine, comDrising:
a plurality of exterior sound measurement sensors surrounding a test path traveled by a work machine for producing sensed exterior sound intensity signals;

processing means for selectively receiving said exterior sound intensity signals and calculating a work machine total sound power level and equivalent sound pressure levels for said Plurality of sensors over a selected time period;

an interior sound measurement sensor for sensing sound pressure levels within an operator cab of the work machine and delivering an interior sound signal to said processing means for calculation of operator equivalent sound pressure levels over said selected time period; and a remote control located on said work machine, the remote control adapted for manually initiating and terminating said selected time period by radio frequency provision of trigger signals to said processing means and said remote control further including a wireless LAN card, wherein said radio frequency provision of trigger signals to said processing means is via said card.

9. An apparatus, as set forth in claim 8, wherein said interior sound measurement sensor is in serial communication with said remote control, and delivers said interior sound signal to said processing means via said wireless LAN card.

10. An apparatus, as set forth in claim 1, wherein said remote control includes display means for displaying instructions to operate the work machine in a specified manner during said selected time period.

11. An apparatus for measuring dynamic work machine sound power, comprising:

exterior sound measurement sensors arranged along a test hemisphere for sensing exterior sound of a work machine and producing sensed exterior sound intensity signals;

processing means for selectively receiving said exterior sound intensity signals and calculating a work machine sound power over a selected time period;

means for sensing movement of the work machine relative to the arrangement of said exterior sound measurement sensors, and responsively initiating and terminating said selected time period by provision of trigger signals to said processing means; and a remote control in communication with said processing means, said remote control located on said work machine and having a display means for displaying instructions to operate the work machine in a specified manner.

12. An apparatus as set forth in claim 11, wherein said means for sensing movement of a work machine includes a photoelectric sensor pair.

13. An apparatus as set forth in claim 12, wherein said photoelectric sensor pair is located to sense movement into and out of said test hemisphere.

14. An apparatus, as set forth in claim 11, further comprising an interior sound measurement sensor for sensing sound pressure levels within an operator cab of the work machine and delivering an interior sound signal to said processing means for calculation of operator equivalent sound pressure levels over said selected time period.

15. An apparatus, as set forth in claim 11, further comprising a host computer having data storage means for storing said sound power and equivalent sound pressure levels in a database in correspondence with machine identifying information uniquely identifying the work machine.

16. An apparatus, as set forth in claim 15, wherein said processing means comprises a digital signal processing board installed on said host computer.

17. An apparatus, as set forth in claim 15, further comprising a weather station for providing values representative of sensed atmospheric conditions to said host computer.

18. An apparatus, as set forth in claim 17, wherein said weather station provides values representing at least one of wind speed, temperature, and barometric pressure to said host computer, and said host computer automatically logs said values in said database in correspondence with said machine identifying information and said sound power and equivalent sound pressure levels.

19. An apparatus, as set forth in claim 11, further comprising said display means displaying instructions to operate a hydraulic implement of the work machine in a specified manner for dynamic machine testing, said remote control providing trigger signals to control said selected time period responsive to operator input indicating initiation and termination of the displayed operation.

20. An apparatus, as set forth in claim 19, further comprising said remote control manually initiating or terminating said selected time period by provision of trigger signals to said processing means.

* * * * *

UNITED STATES PATENT AND TRADEMARK OFFICE
Certificate

Patent No. 6,041,657                                                    Patented: March 28, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Mark B. Sutherland, Peoria, Ill.; David R. Sanderson, Metamora, Ill.; and David C. Copley, Peoria, Ill.

Signed and Sealed this Second Day of January, 2001.

HEZRON E. WILLIAMS
*Supervisory Patent Examiner*
Art Unit 2856